US012790525B2

(12) United States Patent
Becker-Weimann et al.

(10) Patent No.: US 12,790,525 B2
(45) Date of Patent: Nov. 10, 2026

(54) REACTIVE HOT-MELT ADHESIVE COMPOSITIONS BASED ON ALPHA-SILANE-TERMINATED ORGANIC POLYMERS

(71) Applicant: KLEIBERIT SE & Co. KG, Weingarten/Baden (DE)

(72) Inventors: Klaus Becker-Weimann, Baden-Baden (DE); Patrick Frank, Karlsruhe (DE); Steffen Wunderlich, Heidelberg (DE)

(73) Assignee: KLEIBERIT SE & CO. KG, Weingarten/Baden (DE)

( * ) Notice: Subject to any disclaimer, the term of this patent is extended or adjusted under 35 U.S.C. 154(b) by 0 days.

(21) Appl. No.: 18/692,435

(22) PCT Filed: Oct. 18, 2022

(86) PCT No.: PCT/EP2022/078919

§ 371 (c)(1),
(2) Date: Mar. 15, 2024

(87) PCT Pub. No.: WO2023/066902

PCT Pub. Date: Apr. 27, 2023

(65) Prior Publication Data

US 2024/0384145 A1 Nov. 21, 2024

(30) Foreign Application Priority Data

Oct. 22, 2021 (DE) ..................... 10 2021 127 517.2

(51) Int. Cl.

| | |
|---|---|
| ***C09J 5/06*** | (2006.01) |
| ***C09J 133/08*** | (2006.01) |
| ***C09J 133/12*** | (2006.01) |
| ***C09J 171/02*** | (2006.01) |

(52) U.S. Cl.

CPC ............... *C09J 171/02* (2013.01); *C09J 5/06* (2013.01); *C09J 133/08* (2013.01); *C09J 133/12* (2013.01)

(58) Field of Classification Search

USPC .......................................................... 525/404

See application file for complete search history.

(56) References Cited

U.S. PATENT DOCUMENTS

| | | | |
|---|---|---|---|
| 6,749,943 B1 | 6/2004 | Tangen et al. | |
| 7,129,312 B1 | 10/2006 | Krebs et al. | |
| 2004/0162385 A1 | 8/2004 | Krebs | |
| 2004/0259968 A1 | 12/2004 | Krebs | |
| 2005/0032973 A1 | 2/2005 | Krebs et al. | |
| 2010/0006217 A1 | 1/2010 | Slark et al. | |
| 2010/0040894 A1* | 2/2010 | Rosenau | C09J 175/04 428/447 |
| 2012/0040191 A1 | 2/2012 | Kohl et al. | |
| 2012/0123016 A1 | 5/2012 | Bolte et al. | |
| 2012/0322926 A1 | 12/2012 | Suen et al. | |
| 2013/0225745 A1 | 8/2013 | Fujimoto et al. | |
| 2014/0027056 A1 | 1/2014 | Suen | |
| 2014/0155545 A1 | 6/2014 | Stanjek et al. | |
| 2015/0083324 A1 | 3/2015 | Stanjek et al. | |
| 2015/0240105 A1 | 8/2015 | Jing et al. | |
| 2018/0305500 A1 | 10/2018 | Jenkner et al. | |
| 2019/0233562 A1 | 8/2019 | Miyagawa | |
| 2019/0322829 A1 | 10/2019 | Miller et al. | |
| 2020/0317962 A1 | 10/2020 | Laferte et al. | |
| 2021/0009868 A1 | 1/2021 | Miyai et al. | |
| 2023/0159803 A1 | 5/2023 | Becker-Weimann et al. | |

FOREIGN PATENT DOCUMENTS

| | | |
|---|---|---|
| DE | 10 2007 040 802 A1 | 3/2009 |
| DE | 10 2008 038 399 A1 | 2/2010 |
| DE | 10 2012 200 790 A1 | 7/2013 |
| DE | 10 2013 213 835 A1 | 1/2015 |
| EP | 2 610 278 A1 | 7/2013 |
| JP | 2018-518560 A | 7/2018 |
| JP | 2021-507023 A | 2/2021 |
| RU | 2 514 749 C2 | 5/2014 |
| WO | WO 01/40342 A1 | 6/2001 |
| WO | WO 03/006521 A1 | 1/2003 |
| WO | WO 03/033562 A1 | 4/2003 |
| WO | WO 03/055929 A1 | 7/2003 |
| WO | WO 2004/005420 A1 | 1/2004 |

(Continued)

OTHER PUBLICATIONS

DE102007040802A1 Machine Translation (Year: 2008).*
Commission Regulation (EU) 2020/1149, Official Journal of the European Union, Total 6 pages.
International Preliminary Examination Report (PCT/IPEA/409 and PCT/IPEA/416), issued in PCT/EP2022/078919, dated Oct. 6, 2023.
International Search Report (PCT/ISA/210) issued in PCT/EP2022/078919 mailed on Feb. 17, 2023.
Müller et al., Formulation of adhesives and sealants : the competent textbook for study and practice, Vincentz Network; 1st edition, Dec. 2004, 12 pages total.
Written Opinion (PCT/ISA/237) issued in PCT/EP2022/078919 mailed on Feb. 17, 2023.

(Continued)

*Primary Examiner* — Terressa Boykin

(74) *Attorney, Agent, or Firm* — Birch, Stewart, Kolasch & Birch, LLP

(57) ABSTRACT

The present invention relates to reactive hotmelt adhesive compositions comprising, based on the total weight of the composition, a) 3 wt % to 49 wt % of at least one alpha-silane-terminated organic polymer; b) 1 wt % to less than 20 wt %, preferably 1 wt % to 10 wt %, of at least one acrylate resin-based polymer; c) 1 wt % to 20 wt %, preferably 1 wt % to 10 wt %, of at least one chemical compound which is liquid at least at 100° C. and in which at least at 150° C. the at least one acrylate resin-based polymer dissolves; d) 0.001 wt % to 5 wt %, preferably 0.001 wt % to 2 wt %, of at least one oligomeric silane comprising one or more amino groups. The invention additionally relates to processes for producing them and to a process for surface lamination using the composition.

19 Claims, No Drawings

(56) References Cited

FOREIGN PATENT DOCUMENTS

| | | | | |
|---|---|---|---|---|
| WO | WO 2007/074143 A1 | 7/2007 | | |
| WO | WO 2009/117654 A1 | 9/2009 | | |
| WO | WO 2010/108716 A1 | 9/2010 | | |
| WO | WO 2010/115715 A1 | 10/2010 | | |
| WO | WO 2011/087741 A2 | 7/2011 | | |
| WO | WO 2012/033030 A1 | 3/2012 | | |
| WO | WO 2013/026654 A1 | 2/2013 | | |
| WO | WO 2013/107744 A1 | 7/2013 | | |
| WO | WO-2014018349 A1 * | 1/2014 | ........... | C08G 18/289 |
| WO | WO 2016/182655 A1 | 11/2016 | | |
| WO | WO 2016/202359 A1 | 12/2016 | | |
| WO | WO 2018/012234 A1 | 1/2018 | | |
| WO | WO 2019/115952 A1 | 6/2019 | | |
| WO | WO 2019/188930 A1 | 10/2019 | | |
| WO | WO 2021/214290 A1 | 10/2021 | | |

OTHER PUBLICATIONS

"Concept of a percentage," Wayback Internet Archive Machine, URL: https://www.yaklass.ru/p/matematika/5-klass/desiatichnye-drobi-13880/protcenty-zadachi-naprotcenty-nakhozhdenie-protcenta-ot-velichiny-iveli-13738/re-2d34ae88-61f0-407a-be51-de3c1746db71, May 5, 2016, 2 pages total, with partial English translation.

"The dependence of the reactivity of organic compounds on their structure," Wayback Archive Machine, URL: https://xumuk.ru/organika/36.html, Oct. 15, 2007, 6 pages total, with English translation.

Bodo Müller, Walter Rath, Formulierung von Kleb- und Dichtstoffen [Formulation of Adhesives and Sealants], Vincentz Network; 1st edition, Dec. 2004, 7 pages total.

Bredschneider S. et al., "General Principles of Chemical Technology," published by P. Romankov and M.I. Kurochkina, Leningrad (Saint Petersburg), Chemistry, 1977, 4 pages total, with English translation.

English translation of the International Preliminary Report on Patentability for International Application No. PCT/EP2021/060661, dated Apr. 20, 2022.

Karzhenevskaya et al., "Organosilicone compounds and their applications in micro- and nanoelectronics," 56th Scientific Conference of Postgraduate Students, Master's Students and Students of Belarussian State University of Informatics and Radioelectronics (BSUIR), Minsk, 2020, pp. 336-337, with English translation.

L.I. Bondaletova et al., "Polymeric Composite Materials," Publishing House of Tomsk Polytechnic University, Tomsk, 2013, 4 pages total, with English translation.

U.S. Office Action for U.S. Appl. No. 17/919,384, dated Aug. 14, 2025.

U.S. Office Action for U.S. Appl. No. 17/919,384, dated Jan. 26, 2026.

U.S. Office Action for U.S. Appl. No. 17/919,384, dated May 7, 2026.

Xiao et al., "Research on Hydrolysis & Condensation Mechanism and Applications of its Oligomer in Resin," Silicone Material, S1, Apr. 20, 2018, pp. 67-73, abstract only.

U.S. Office Action for U.S. Appl. No. 17/919,384, dated Sep. 24, 2026.

U.S. Office Action for U.S. Appl. No. 17/919,384, dated Aug. 19, 2026.

* cited by examiner

REACTIVE HOT-MELT ADHESIVE COMPOSITIONS BASED ON ALPHA-SILANE-TERMINATED ORGANIC POLYMERS

The present invention relates to reactive hotmelt adhesive compositions. The invention additionally relates to processes for producing them and also to a process for surface lamination using the composition.

Reactive hotmelt adhesives, by virtue of their advantages, such as, for example, a short setting time, high initial strength, and stability, occupy a large market share, are diversely employed, and in many applications have replaced solventborne adhesives (see, for example, Bodo Müller, Walter Rath, *Formulierung von Kleb-und Dichtstoffen* [Formulation of Adhesives and Sealants], Vincentz Network; $1^{st}$ edition, December 2004).

The principal representatives among the reactive hotmelt adhesives are moisture-crosslinking polyurethanes based on methylene diphenyl diisocyanate (MDI). Working with monomeric MDI, because of its sensitizing effect, has been restricted in the recent past under REACH, as evident from EU Regulation 2020/1149.

Described in the patent literature are processes for producing reactive polyurethane hotmelt adhesives with low monomer content, based on MDI (see, for example, WO 03/055929 A1, WO 01/40342 A1, WO 03/033562 A1, WO 03/006521 A1).

Also described are processes for silanizing polyurethane hotmelt adhesives, which represent an isocyanate-free alternative. This process generally entails the introduction of moisture-crosslinking di- and/or trialkoxysilane units. One possibility for production is represented by the reaction of the isocyanate groups of reactive polyurethane hotmelt adhesives with secondary aminosilanes (e.g. WO 2004/005420 A1). The crosslinking reaction is accelerated generally using aminosilanes, tin accelerators and/or strong nitrogen bases (e.g., 1,8-diazabicyclo [5.4.0]undec-7-ene). A disadvantage of this process is that these accelerators may at the same time promote the hydrolysis of the ester units usually present in reactive polyurethane hotmelt adhesives. The resulting formulations also generally no longer have sufficient stability to allow them to be processed on roll applicator machines. Reactive hotmelt adhesives are frequently processed using roll applicator machines and are often exposed to the ambient humidity. The formulations accordingly must be sufficiently stable and must, even during plant standstill of short duration, not react with the ambient moisture to an extent such as to result in a significant increase in the application rate and in stringing, with the latter adversely affecting the applied appearance.

Stable hotmelt adhesive formulations based on silane-terminated polymers constitute a class of adhesive that is of interest. Moreover, such silane-functional adhesives have a broad adhesion spectrum, which may constitute an advantage by comparison with isocyanate-crosslinking systems, for example. Since in the case of silane-terminated polymers a silane group is able to enter generally into two to three condensation reactions, a higher crosslinking density relative to structurally comparable isocyanate-based binders is also a possibility. It would be advantageous in this context for these adhesives to be able to be processed in part via applicator rolls at high temperatures in a reliable operation, among other factors, and to have a high initial adhesion as typical for this application, and also to exhibit chemical through-curing that is acceptable for industrial applications.

As part of this development, for the production of silane-based formulations, two pathways have been presumed. As well as the silanization of existing reactive PU hotmelt adhesives, as described in more detail above, where the isocyanate groups of the adhesives are reacted chemically with secondary aminosilanes, commercially available silane binders, on the other hand, are formulated with crystalline or amorphous resins with the aim of realizing high initial adhesion.

For example, WO 2007/074143 A1 describes moisture-curing hotmelt adhesive compositions by means of silane-functionalized polyurethane prepolymers.

WO 2013/026654 A1 describes crosslinkable compositions based on organyloxysilane-terminated polymers. Described in this context, as in DE 10 2013 213 835 A1, are blends of alpha-silanes, such as, for example, Geniosil® STP-E10 and silicone resins.

WO 2011/087741 A2 describes adhesives for binding books and related articles and the production of such adhesives with silane-modified liquid polymers. The adhesives are said in particular to have a reduced monomeric diisocyanate content or not to contain any monomeric diisocyanates.

In both cases the result was initially not satisfactory. The formulations attained had too low an initial adhesion, were not roll-stable, or underwent through-curing too slowly.

Candidates for improving the initial adhesion include polyester and polyacrylate resins. With polyester resins, there is a risk of degradation by hydrolysis, which is catalyzed by the typical silane adhesive accelerators, such as by aminosilanes, for example. Suitable crystalline polyacrylate resins, on the other hand, have to be melted at very high temperatures (around 150° C.). At these temperatures, however, commercially available polyether-based silane binders lack stability.

It was an object of the present invention, therefore, to provide reactive hotmelt adhesive compositions which exhibit the above-stated disadvantages not at all or at least to a lesser extent.

The object has been achieved by means of a reactive hotmelt adhesive composition comprising, based on the total weight of the composition, a) 3 wt % to 49 wt % of at least one alpha-silane-terminated organic polymer;
b) 1 wt % to less than 20 wt %, preferably 1 wt % to 10 wt %, of at least one acrylate resin-based polymer;
c) 1 wt % to 20 wt %, preferably 1 wt % to 10 wt %, of at least one chemical compound which is liquid at least at 100° C. and in which at least at 150° C. the at least one acrylate resin-based polymer dissolves;
d) 0.001 wt % to 5 wt %, preferably 0.001 wt % to 2 wt %, of at least one oligomeric silane comprising one or more amino groups.

The object has likewise been achieved by means of a process for producing a reactive hotmelt adhesive composition according to the present invention, comprising the steps of (a) adding at least one acrylate resin-based polymer to at least one chemical compound which is liquid at least at 100° C. and in which at least at 150° C. the at least one acrylate resin-based polymer dissolves, or adding it to a mixture which comprises the at least one chemical compound, at a temperature in the range of 130° C. to 170° C.;
(b) cooling the mixture to a temperature in the range from 80° C. to 120° C.;

(c) adding at least one alpha-silane-terminated organic polymer to the cooled mixture;

(d) adding at least one oligomeric silane comprising one or more amino groups, to give a reactive hotmelt adhesive composition as claimed in the present invention.

The object has likewise been achieved by means of a process for surface lamination, comprising the step of applying a reactive hotmelt adhesive composition according to the present invention to a substrate by means of an applicator roll.

The requirement for a roll-stable adhesive at processing temperatures of 100-120° C. with an acceptable through-curing rate has surprisingly been realized with binders based on silane-terminated polymers (so-called alpha-silanes), where it has been possible to employ an acrylate resin-based polymer which can be dissolved at least to 150° C. by means of a chemical compound which is liquid at least to 100° C., and also by means of at least one oligomeric silane comprising one or more amino groups. In this way it has been possible to produce hydrolysis-stable formulations having a satisfactory initial adhesion. Furthermore, the reactive hotmelt adhesive compositions of the invention have high crosslinking densities, and this may be a reason for good plasticizer stability.

Accordingly the reactive hotmelt adhesive composition according to the present invention represents a moisture-crosslinking adhesive formulation which at 100° C. is of low viscosity and largely roll-stable and is based on alpha-silane terminated polymers, which at room temperature exhibit an initial adhesion sufficiently high for surface laminations and in chemical terms undergo through-curing with sufficient rapidity. A condensation reaction in the course of curing leads to elimination of alcohol (more particularly methanol, possibly also ethanol) with accompanying formation of siloxane groups.

Looked at more closely, with alpha-silanes there is known to be a largely autocatalytic two-stage condensation reaction of alkoxysilanes as a result of the donor atom (nitrogen atom, for example) which is located in the alpha-position to the silicon atom (alpha effect). The reactive hotmelt adhesive compositions according to the present invention are accelerated by aminosilanes and operate without the use of further cocatalysts such as, for example, tin organyls or diazabicycloundecene. Surprisingly it has emerged, as part of this invention, that formulations containing an alpha-silane are roll-stable over a period of around 30-60 minutes at 100° C. without containment under customary ambient conditions (room temperature around about 20-23° C., ambient humidity around 30-65% r.h) and, in spite of the moderate acceleration and without the use of further cocatalysts, undergo chemical through-curing with sufficient rapidity.

The present invention relates accordingly to a reactive hotmelt adhesive composition. The term "hotmelt adhesive" here outlines an adhesive which at room temperature is solid or has a high shear modulus and at elevated temperature, usually at a temperature of 100° C. to 120° C., is in liquid form. Hotmelt adhesives are applied in liquid form and resolidified, and so at room temperature are again in solid form or have a high shear modulus. A further feature of "reactive" hotmelt adhesives is that they crosslink through chemical reaction. In this case there is usually a reaction with water, which in the form, for example, of atmospheric humidity comes into contact with the hotmelt adhesive. They are therefore referred to as moisture-crosslinking. This also applies to the reactive hot-applied adhesive compositions of the present invention.

The reactive hot-applied adhesive composition of the present invention is likewise liquid at a temperature of 100° C. to 120° C. In this case these adhesives customarily have a viscosity of 4000 mPas to 12 000 mPas. Reactive hot-applied adhesive composition of the invention is preferably isocyanate-free, The reactive hotmelt adhesive composition according to the present invention comprises components a) to d). The composition of the invention may further comprise additional constituents. One embodiment of the present invention, accordingly, relates to a reactive hotmelt adhesive composition which consists of components a) to d). Another embodiment of the present invention relates to a reactive hotmelt adhesive composition which as well as components a) to d) additionally comprises one or more, such as two, three, four, five, six, seven, eight, nine or ten, components.

Component a) of the reactive hotmelt adhesive composition of the invention represents at least one alpha-silane-terminated organic polymer. The reactive hotmelt adhesive composition according to the present invention may accordingly comprise one alpha-silane-terminated polymer or two or more polymers, such as two, three or four. In this case it is clear to the competent skilled person that polymers are not pure compounds, but instead, as a result of their production, occur as a mixture of compounds having a characteristic compound distribution, and therefore "a polymer" is a simplifying representation of this mixture of compounds.

Alpha-silane-terminated organic polymers are known to the skilled person and may be obtained commercially, for example. For instance, Wacker Chemie AG, Munich (DE) sells such alpha-silane-modified polymers under the Geniosil®, designation, such as Geniosil® STP-E10 or Geniosil® XB 502.

A feature of alpha-silanes is the so-called alpha effect. With this effect, the vicinity of an electronegative donor, such as nitrogen or oxygen, in the alpha-position to the silicon atom, i.e., separated from it only by a methylene bridge, for example, has the effect of activating alkoxy groups on the silicon atom. These groups are consequently more reactive toward nucleophiles, such as water. This in turn produces an accelerated hydrolysis, without the need, for example, for tin-containing catalysts. The hydrolysis of the silanes may be accompanied by crosslinking to form siloxanes. Accordingly, reactive hotmelt adhesive compositions of the present invention represent alpha-silane-terminated hotmelt adhesives which are able to undergo a moisture crosslinking reaction to form siloxanes.

The at least one alpha-silane-terminated organic polymer is preferably a polymer which comprises a multiplicity of end groups of the formula $$*{-}X{-}C({=}O){-}N(R){-}C(R^1R^2){-}Si(R^3)_a(OR^4)_{3-a}$$

where

X is O or N(R);

each R independently of any other is hydrogen or a hydrocarbon radical having 1 to 20 carbon atoms;

$R^1$ and $R^2$ independently of one another are hydrogen or a hydrocarbon radical having 1 to 20 carbon atoms;

$R^3$ and $R^4$ independently of one another are a hydrocarbon radical having 1 to 20 carbon atoms;

a is 0, 1 or 2, and

"*" marks the bond for attachment to the polymer.

More preferably R is hydrogen or an alkyl radical which comprises 1 to 4 carbon atoms, where the alkyl radical may be straight-chain or branched. More preferably still R is H, methyl or ethyl, and more preferably still is hydrogen or methyl.

With more particular preference R is hydrogen.

More preferably $R^1$ and $R^2$ are identical. Additionally more preferably $R^1$ and $R^2$ are hydrogen or an alkyl radical which comprises 1 to 4 carbon atoms, where the alkyl radical may be straight-chain or branched. More preferably still $R^1$ and $R^2$ are H, methyl or ethyl, and more preferably still are hydrogen or methyl.

With more particular preference $R^1$ and $R^2$ are hydrogen.

More preferably $R^3$ and $R^4$ are identical. Additionally more preferably $R^3$ and $R^4$ are an alkyl radical which comprises 1 to 4 carbon atoms, where the alkyl radial may be straight-chain or branched. More preferably still $R^3$ and $R^4$ are methyl or ethyl.

With more particular preference $R^3$ and $R^4$ are methyl.

Preferably a is 1 or 2, more preferably a is 1.

An illustrative at least one alpha-silane-terminated organic polymer is a polymer which comprises a multiplicity of end groups of the formula $*—O—C(=O)—NH—CH_2—Si(CH_3)(OCH_3)_2$.

The multiplicity of the end groups described in more detail above terminates an organic polymer. The organic polymer is preferably a polyoxyalkylene, a hydrocarbon polymer, a polyurethane, a polyester, a polyamide, a polyacrylate, a polymethacrylate or a polycarbonate. Polyoxyalkylene is preferred. The organic polymer preferably contains no further silane groups beyond the end groups recited above.

Preferred polyoxyalkylenes are polypropylenes, having, for example, a number-average molecular weight in the range from 5000 g/mol to 50 000 g/mol, more preferably from 7500 g/mol to 30 000 g/mol, more preferably from 10 000 g/mol to 15 000 g/mol.

Component a) has a fraction of 3 wt % to 49 wt %, based on the total weight of the composition. The fraction is preferably 3 to 20 wt %, more preferably 5 to 20 wt %.

The reactive hotmelt adhesive composition according to the present invention additionally comprises at least one acrylate resin-based polymer as component b). Accordingly the composition of the invention may comprise one or more, such as two, three or four, acrylate-based polymers. In this case it is clear to the competent skilled person that polymers are not pure compounds, but instead, as a result of their production, occur as a mixture of compounds having a characteristic compound distribution, and therefore “a polymer” is a simplifying representation of this mixture of compounds. Component b) preferably comprises only of one acrylic resin-based polymer.

Where component a) as organic polymer is likewise an acrylate resin-based polymer, components a) and b) may be distinguished from one another in that component b) contains no alpha-silane-terminated groups.

The acrylate-based polymer is preferably a homoacrylate, a homomethacrylate, a copolymer of at least two different acrylates, a copolymer of at least two different methacrylates or a copolymer of at least one acrylate and at least one methacrylate.

The fraction of component b) is 1 wt % to 20 wt %, based on the total weight of the reactive hotmelt adhesive composition of the invention. The fraction is preferably 1 wt % to 10 wt %. More preferably the fraction is 8 wt % to 9 wt %.

The purpose of component b) is to achieve sufficient initial adhesion. In this context, more particular preference is given to a copolymer consisting of methyl methacrylate and n-butyl methacrylate.

The at least one acrylate resin-based polymer may be crystalline, partially crystalline or amorphous and therefore has a melting point, a melting range (in this case the lower temperature point is regarded as the melting point) or a glass transition temperature. This temperature is situated preferably in a range from 30° C. to 300° C., more preferably in a range from 30° C. to 250° C., more preferably still in a range from 30° C. to 150° C., more preferably still in a range from 30° C. to 80° C., more preferably still in a range from 40° C. to 75° C., more preferably still in a range of 50° C. and 70° C., and more particularly at 60° C. The at least one acrylate resin-based polymer is preferably amorphous, and so in that case the specified temperature values refer to its glass transition temperature.

The at least one acrylate resin-based polymer preferably has an average weight-average molar weight in the range from 10 000 g/mol to 150 000 g/mol. More preferred is a range from 25 000 g/mol to 125 000 g/mol, still more preferred a range from 30 000 g/mol to 110 000 g/mol, still more preferred a range from 35 000 g/mol to 100 000 g/mol, still more preferred a range from 40 000 g/mol to 90 000 g/mol, still more preferred a range from 45 000 g/mol to 80 000 g/mol, still more preferred a range from 50 000 g/mol to 70 000 g/mol, and more particularly the average weight-average molar weight is 60 000 g/mol.

As component c), the reactive hotmelt adhesive composition comprises at least one chemical compound which is liquid at least at 100° C. and in which at least at 150° C. the at least one acrylate resin-based polymer dissolves.

In the context of the present invention, “dissolves at least at 150° C.” refers to the dissolution of solid acrylic resin-based polymer. The dissolving may, however, also take place at a lower temperature. Where the melting point or melting range or the glass transition temperature is below 150° C., “dissolves” refers to the production of a single-phase mixture with the chemical compound.

Component c) may comprise one chemical compound or two or more, such as two, three or four, compounds. Advantageously it comprises only one compound. Component c) is different to component a) or b). A compound is to be considered accordingly as component c) if it is capable of dissolving component b) at least at 150° C. in the ambit of its possible fractions as a proportion of the total composition, while being itself in liquid form at least to 100° C. and differing from components a) and b).

The fraction of component c) is 1 wt % to 20 wt %, based on the total weight of the reactive hot-applied adhesive composition of the invention. The fraction is preferably 1 wt % to 10 wt %. More preferably the fraction is 6 wt %.

The only important factor for the chemical compound, aside from its solvency, is that it is present as a liquid at least at 100° C. Numerous compounds can be used, and the skilled person is capable of finding suitable compounds by simple dissolution tests. Recited below are illustrative compounds which can be used.

The at least one chemical compound which is liquid at least at 100° C. and in which at least at 150° C. the at least one acrylate resin-based polymer dissolves may advantageously be a plasticizer.

Illustrative plasticizers are known in the prior art. Reference may be made in this context to the examples recited in DIN EN ISO 1043-3 (2017-03).

Examples of plasticizers are therefore:

| | | |
|---|---|---|
| Alkylsulfonic esters | Diisooctyl maleate | N-butylbenzenesulfonamide |
| Butyl O-acetylrinoleate | Diisooctyl phthalate | Nonyl undecyl adipate |
| Benzyl butyl phthalate | Diisooctyl sebacate | Nonyl undecyl phthalate |
| Butyl cyclohexyl phthalate | Diisooctyl azelate | Octyl decyl adipate |
| Butyl nonyl phthalate | Diisopentyl phthalate | Octyl decyl phthalate |
| Benzyl octyl adipate | Di-2-methyloxyethyl phthalate | N octyl decyl trimellitate |
| Butyl octyl phthalate | Dimethyl phthalate | Liquid paraffin |
| Butyl stearate | Dimethyl sebacate | Polypropylene adipate |
| Dibutyl adipate | Dinonyl fumarate | Polypropylene sebacate |
| Di-2-butoxy ethyl phthalate | Dinonyl maleate | Sucrose octaacetate |
| Dibutyl fumarate | Di-n-octyl phthalate | Tributyl O-acetylcitrate |
| Dibutyl maleate | Dinonyl phthalate | Tri-2-butoxy ethyl phosphate |
| Dibutyl phthalate | Dinonyl sebacate | Tributyl phosphate |
| Dibutyl sebacate | Dioctyl adipate | Trichloroethyl phosphate |
| Dibutyl azelate | Dioctyl isophthalate | Tricresyl phosphate |
| Dicyclohexyl phthalate | Dioctyl phthalate | Tri-2,3-dibromopropyl phosphate |
| Dicapryl phthalate | Dioctyl sebacate | Tri-2,3-dichloropropyl phosphate |
| Didecyl phthalate | Dioctyl terephthalate | Triethyl o-acetylcitrate |
| Diethylene glycol dibenzoate | Dioctyl azelate | Tetrahydrofurfuryl oleate |
| Diethyl phthalate | Diphenyl cresyl phosphate | Triheptyl trimellitate |
| Diheptyl phthalate | Di-propylene glycol dibenzoate | Triisooctyl trimellitate |
| Dihexyl phthalate | Diphenyl octyl phosphate | Trioctyl phosphate |
| Diisobutyl adipate | Diphenyl phthalate | Tetraoctyl pyromellitate |
| Diisobutyl maleate | Diisotridecyl phthalate | Trioctyl trimellitate |
| Diisobutyl phthalate | Diundecyl phthalate | Triphenyl phosphate |
| Diisodecyl adipate | Epoxidized Linseed oil | Trixylylene phosphate |
| Diisodecyl phthalate | Epoxidized soyabean oil | Diisononylester 1,2-cyclohexanedicarboxlate |
| Diisoheptyl phthalate | Glycerol triacetate | Isodecyl benzoate |
| Diisohexyl phthalate | Heptyl nonyl undecyl adipate | |
| Diisononyl adipate | Heptyl nonyl undecyl phthalate | |
| Diisononyl phthalate | Hexyl octyl decyl adipate | |
| Diisooctyl adipate | Hexyl octyl decyl phthalate | |

Such plasticizers are available commercially. An illustrative instance is Hexamolle DINCH from BASF SE, Ludwigshafen (DE). Preference is given to diisononyl 1,2-cyclohexanedicarboxylate or isodecyl benzoate.

It is also possible for the at least one chemical compound which is liquid at least at 100° C. and in which at least at 150° C. the at least one acrylate resin-based polymer dissolves to be a polyalkylene glycol. Preferred polyalkylene glycols are polyethylene glycol and polypropylene glycol, more preferably polypropylene glycol. The polyalkylene glycol preferably has a number-average molecular weight in the range from 500 g/mol to 5000 g/mol, more preferably in the range from 750 g/mol to 4000 g/mol, more preferably in the range from 1000 g/mol to 3000 g/mol, and more particularly the number-average molecular weight is 2000 g/mol.

It is also possible for the at least one chemical compound which is liquid at least at 100° C. and in which at least at 150° C. the at least one acrylate resin-based polymer dissolves to be an alkoxysilane. Alkoxysilanes are available commercially. An example that may be given is the one with the trade designation Tegopac® from Evonik Industries AG, Essen (DE). This is a binder with pendently crosslinking ethoxysilanes.

The reactive hotmelt adhesive composition of the invention additionally comprises a component d) which comprises at least one oligomeric silane comprising one or more amino groups. Component d) may therefore comprise one or more, such as two, three or four, such silanes. Preferably component d) consists only of one component. Component d) is different to components a) to c) and is therefore only considered as component d) if it cannot be interpreted as one of components a) to c).

The at least one oligomeric silane comprising one or more amino groups, of component d), preferably constitutes a mixture of amino group-containing alkoxy-/hydroxy-silanes and/or silanols and condensation products and co-condensation products based thereon and preferably has a molecular weight of more than 500 g/mol.

Such oligomeric silanes comprising one or more amino groups are available commercially, for example as Dynasylan® 1146 from Evonik. They are described for example in DE 10 2007 040 802 A1. Accordingly, their preparation may be described as follows.

As already observed above, the at least one oligomeric silane comprising one or more amino groups is a mixture which may be obtained by (A) at least one aminoalkylalkoxysilane of the general formula I $$NR'_2[(CH_2)_2NR']_x—Y—Si(R'')_n(OR)_{3-n}, \qquad (I)$$

in which groups R, R' and R" are identical or different and are each a hydrogen atom or a linear or branched alkyl group having 1 to 8 C atoms, Y is a divalent alkylene group from the series $—CH_2—$, $—(CH_2)_2—$, $—(CH_2)_3—$ or $—[CH_2CH(CH_3)CH_2]—$, x is 0, 1 or 2, and n is 0 or 1, or (B) at least one bis-silylated alkylamine of the general formula II $$(RO)_{3-m}(R'')_mSi-Y-[NR'(CH_2)_2]_yNR'[(CH_2)_2NR']_z-Y-Si(R'')_n(OR)_{3-n}, \quad (II)$$

in which groups R, R' and R" are identical or different and are each a hydrogen atom or a linear or branched alkyl group having 1 to 8 C atoms, groups Y are identical or different and Y is a divalent alkylene group from the series—$CH_2$—, —$(CH_2)_2$—, —$(CH_2)_3$- or —$[CH_2CH(CH_3)CH_2]$—, y and z independently are 0, 1 or 2, and m and n independently are 0 or 1, or (C) at least one tris-silylated alkylamine of the general formula III $$N-[Y-Si(R'')_n(OR)_{3-n}]_3, \quad (III)$$

in which groups R and R" are identical or different and are each a hydrogen atom or a linear or branched alkyl group having 1 to 8 C atoms, Y independently is a divalent alkylene group from the series—$CH_2$—, —$(CH_2)_2$—, —$(CH_2)_3$— or —$[CH_2CH(CH_3)CH_2]$—, and n independently is 0 or 1, or (D) at least two of the aforesaid silylated alkylamines of the general formula I, II and Ill being subjected, with a defined amount of water and optionally with addition of an acid, to hydrolysis and also to condensation or co-condensation and the free alcohol being removed substantially from the system.

Mono-silylated amines here are intended to mean those of the formula I. Oligo-silylated amines are intended in particular to mean those which carry two and more than two silyl groups on an amino group or alkyl amine, for example of the formula II (bis-silylated) or formula III (tris-silylated), and/or corresponding compounds, which may also be present in cyclized form.

The preparation of the mixture employs aminoalkylalkoxysilanes of the general formula I which are preferably $$H_2N(CH_2)_3Si(OCH_3)_3, \quad (AMMO)$$

$$H_2N(CH_2)_3Si(OC_2H_5)_3, \quad (AMEO)$$

$$H_2N(CH_2)_2NH(CH_2)_3Si(OCH_3)_3, \quad (DAMO)$$

$$H_2N(CH_2)_2NH(CH_2)_2NH(CH_2)_3Si(OCH_3)_3, \quad (TRIAMO)$$

and also, optionally, corresponding so-called cyclic compounds.

As compounds of formula II, preference is given to $$(H_3CO)_3Si(CH_2)_3NH(CH_2)_3Si(OCH_3)_3, \quad (Bis\text{-}AMMO)$$

$$(H_5C_2O)_3Si(CH_2)_3NH(CH_2)_3Si(OC_2H_5)_3, \quad (Bis\text{-}AMEO)$$

$$(H_3CO)_3Si(CH_2)_3NH(CH_2)_2NH(CH_2)_2NH(CH_2)_3Si(OCH_3)_3, \quad (Bis\text{-}DAMO)$$

$$(H_3CO)_3Si(CH_2)_3NH(CH_2)_2NH(CH_2)_2NH(CH_2)_2NH(CH_2)_2NH(CH_2)_3Si(OCH_3)_3, \quad (Bis\text{-}TRIAMO)$$

and as compounds of formula III to $$N[CH_2)_3Si(OCH_3)_3]_3, \quad \text{(Tris-AMMO)}$$

$$N[CH_2)_3Si(OC_2H_5)_3]_3. \quad \text{(Tris-AMEO)}$$

Accordingly, for the preparation of the mixture, preference is given to selecting at least one component (A) from the series AMMO, AMEO, DAMO, TRIAMO, 3-(N-alkylamino) propyltrialkoxysilane, where alkyl is methyl, ethyl, n-propyl or n-butyl and alkoxy is methoxy or ethoxy; a preferred selection of component (B) may be made from the series Bis-AMMO, Bis-AMEO, Bis-DAMO and of component (C) from the series Tris-AMMO, Tris-AMEO.

For the preparation of the mixture it is likewise possible advantageously to use mixtures which comprise compounds of the general formulae I, II, and/or III. Mixtures of this kind which can be used may also include what are called partial condensation products of said aminoalkoxysilanes. By partial condensation products or reaction products of aminoalkoxysilanes of the general formulae I, II and/or III are meant suitably those dimeric, trimeric, tetrameric or higher oligomeric products which in general are formed by condensation or co-condensation and/or pre-hydrolysis of the respective monomers with elimination of alcohol. In such condensates or co-condensates, accordingly, the reactant components are linked via Si—O—Si bonds. It is additionally known that in the course of hydrolysis or alcoholysis, a ring system opens and the corresponding or aminoalkylalkoxysilane -silanol is obtained. Compounds of the general formula II may also be present in cyclic or bicyclic form and be used as such.

The product of the reaction is understood chemically to comprise substantially a mixture of amino group-containing alkoxy-/hydroxy-silanes and/or silanols and also condensation and co-condensation products based thereon (corresponding linear, branched, cyclic and also optionally three-dimensionally crosslinked siloxanes) originating from compounds of the general formulae I, II or III and/or corresponding partial condensation products.

When preparing the mixture, the reaction, more particularly hydrolysis and also condensation or co-condensation, is preferably conducted at a temperature <100° C., preferably of 10 to 80° C., more preferably of 15 to 60° C., more particularly of 20 to 50° C.

An organic or inorganic acid may optionally be used when preparing the mixture. Hence it is possible advantageously to employ hydrochloric acid (HCl or aqueous hydrogen chloride acid) or aqueous acetic acid or aqueous formic acid, where the fraction of water introduced as a result should at the same time be counted part of the amount of water to be introduced in accordance with the invention for the targeted hydrolysis of the alkoxysilanes. However, acid may also be added following the preparation of the mixture, with adjustment preferably to a pH of 2 to 6, more particularly of 3 to 5.

The preparation of the mixture is followed in particular by distillative workup of the product mixture from the reaction; in other words, from the product mixture obtained, the constituents which are otherwise volatile under ambient conditions, more particularly the hydrolysis alcohol and also any added solvent or diluent, are distilled off at least proportionally, preferably with gentle heating and under reduced pressure. The quantity of volatile constituents which are removed from the system may optionally be replaced by the volumetrically equal quantity of water and/or acid.

The mixture may therefore preferably contain organic or inorganic acid, with the present degree of neutralization of the aminoalkyl and oligo-silylated aminoalkyl groups being suitably from 0 to 125%, preferably 0.1 to 120%, more preferably 70 to 115%, very preferably 75 to 110%, based on the amine number. The determination of the amine number may be carried out in general according to DIN 32 625 (potentiographic titration with HCl).

The acid used is preferably an organic or inorganic acid, more particularly hydrochloric acid, acetic acid or formic acid, with the aminoalkyl- and oligo-silylated aminoalkyl-functional silicon compounds in the composition present being present according to chemical understanding at least proportionally in the form of a cationic amine mixture—in other words, a composition used in the invention preferably contains acid and/or a corresponding salt of acid and one of the amino-functional compounds present.

The mixture may have a viscosity of 2 to 1000 mPa s, preferably 3 to 500 mPa s, more preferably of 4 to 250 mPa s, where the viscosity may be determined for example in accordance with DIN 53 015.

The fraction of component d) is 0.001 wt % to 5 wt %, based on the total weight of the hotmelt adhesive composition of the invention. The fraction is preferably 0.001 wt % to 2 wt %. With additional preference the fraction is 1.2 wt %.

Besides the above-recited components a) to d), the hot-applied adhesive composition of the invention may comprise additional components.

Hence the hot-applied adhesive composition of the invention may comprise at least one silicone resin, such as a phenyl silicone resin. Silicone resins are described for example in DE 10 2013 213 835 A1. A silicone resin is considered an additional component in the context of the present invention if it is not already one of the components designated above.

Possible silicone resins according to DE 10 2013 213 835 A1 accordingly comprise units of the formula $$R^{3'}_{c'}(R^{4'}O)_{d'}R^{5'}_{e'}SiO_{(4-c'-d'-e')/2}, \quad \text{(II)}$$

where $R^{3'}$ may be identical or different and is hydrogen atom, a monovalent, SiC-bonded, optionally substituted aliphatic hydrocarbon radical or a divalent, optionally substituted, aliphatic hydrocarbon radical which bridges two units of the formula (II), $R^{4'}$ may be identical or different and is hydrogen atom or a monovalent, optionally substituted hydrocarbon radical, $R^{5'}$ may be identical or different and is a monovalent, SiC-bonded, optionally substituted aromatic hydrocarbon radical, c' is 0, 1, 2 or 3, d' is 0, 1, 2 or 3, preferably 0, 1 or 2, more preferably 0 or 1, and e' is 0, 1 or 2, preferably 0 or 1, with the proviso that the sum of c'+d'+e' is less than or equal to 3, e' is other than 0 in at least one unit, and in at least 40% of the units of the formula (II) the sum c'+e' is 0 or 1.

Suitable silicone resins consist preferably to an extent of at least 90 wt % of units of the formula (II), more preferably exclusively of units of the formula (II).

Examples of radicals $R^3$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical, isooctyl radicals and the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radicals; alkenyl radicals, such as the vinyl, 1-propenyl and the 2-propenyl radical; aryl radicals, such as the phenyl, naphthyl, anthryl and phenanthryl radical; alkaryl radicals, such as o-, m-, p-tolyl radicals; such as xylyl radicals and ethylphenyl radicals; and aralkyl radicals, such as the benzyl radical, the o and the β-phenylethyl radical.

Examples of substituted radicals $R^{3'}$ are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Radical $R^{3'}$ preferably comprises optionally halogen-atom-substituted, monovalent hydrocarbon radicals having 1 to 6 carbon atoms, more preferably alkyl radicals having 1 or 2 carbon atoms, more particularly the methyl radical. The radical $R^{3'}$ may alternatively comprise divalent aliphatic radicals which join two silyl groups of the formula (II) to one another, such as, for example, alkylene radicals having 1 to 10 carbon atoms, such as, for instance, methylene, ethylene, propylene or butylene radicals.

Preferably, however, radical $R^{3'}$ comprises optionally halogen-atom-substituted, monovalent, SiC-bonded, aliphatic hydrocarbon radicals having 1 to 18 carbon atoms, more preferably aliphatic hydrocarbon radicals having 1 to 6 carbon atoms, more particularly the methyl radical.

Examples of radical $R^{4'}$ are hydrogen atom or the examples specified for radical $R^{3'}$.

Radical $R^{4'}$ preferably comprises a hydrogen atom or optionally halogen-atom-substituted alkyl radicals having 1 to 10 carbon atoms, more preferably alkyl radicals having 1 to 4 carbon atoms, more particularly the methyl and ethyl radical.

Examples of radicals $R^{5'}$ are the aromatic radicals specified above for $R^{3'}$.

Radical $R^{5'}$ preferably comprises optionally halogen-atom-substituted, SiC-bonded aromatic hydrocarbon radicals having 1 to 18 carbon atoms, such as, for example, ethylphenyl, tolyl, xylyl, chlorophenyl, naphthyl or styryl radicals, more preferably the phenyl radical.

Preference is given to using silicone resins in which at least 90% of all the radicals $R^{3'}$ are methyl radical, at least 90% of all the radicals $R^{4'}$ are methyl, ethyl, propyl or isopropyl radical, and at least 90% of all the radicals $R^{5'}$ are phenyl radical.

Preferred silicone resins are those which comprise at least 40%, more preferably at least 60%, of units of the formula (II) in which c' is 0, based in each case on the total number of units of the formula (II).

Preferred silicone resins used are those which, based in each case on the total number of units of the formula (II), comprise at least 70%, more preferably at least 80% of units of the formula (II) in which d' has the value of 0 or 1.

Preferred silicone resins used are those which, based in each case on the total number of units of the formula (II) comprise at least 20%, more preferably at least 40%, of units of the formula (II) in which e' has the value of 1. Silicone resins may be used which comprise exclusively units of the formula (II) in which e' is 1, but more preferably at least 10%, more preferably at least 20%, at most 60%, more preferably at most 80%, of the units of the formula (II) have an e' of 0.

Preferred silicone resins used are those which, based in each case on the total number of units of the formula (II), comprise at least 50%, more preferably at least 70%, more particularly at least 80% of units of the formula (II) in which the sum c'+e' is 1.

One particularly preferred embodiment of the invention uses silicone resins which, based in each case on the total number of units of the formula (II), comprise at least 20%, more preferably at least 40%, of units of the formula (II) in which e' has a value of 1 and c' has a value of 0. Preferably in this case at most 40%, more preferably at most 70%, of all the units of the formula (II) have a d' other than 0.

An additional particularly preferred embodiment of the invention uses silicone resins which, based in each case on the total number of units of the formula (II), comprise at least 20%, more preferably at least 40%, of units of the formula (II) in which e' has a value of 1 and c' has a value of 0 and which also comprise at least 1%, preferably at least 10%, of units of the formula (II) in which c' is 1 or 2, preferably 1, and e' is 0.

Examples of the silicone resins are organopolysiloxane resins which consist substantially, preferably exclusively, of (Q) units of the formulae $SiO_{4/2}$, $Si(OR^{4'})O_{3/2}$, $Si(OR^{4'})_2O_{2/2}$ and $Si(OR^{4'})_3O_{1/2}$, (T) units of the formulae $PhSiO_{3/2}$, $PhSi(OR^{4'})O_{2/2}$, $PhSi(OR^{4'})_2O_{1/2}$, $MeSiO_{3/2}$, $MeSi(OR^{4'})O_{2/2}$ and $MeSi(OR^{4'})_2O_{1/2}$, (D) units of the formulae $Me_2SiO_{2/2}$, $Me_2Si(OR^{4'})O_{1/2}$, $Ph_2SiO_{2/2}$ and $Ph_2Si(OR^{4'})O_{1/2}$, $MePhSiO_{2/2}$ and $MePhSi(OR^{4'})O_{1/2}$, and (M) units of the formula $Me_3SiO_{1/2}$, where Me is a methyl radical, Ph is a phenyl radical and $R^{4'}$ is hydrogen atom or optionally halogen-atom-substituted alkyl radicals having 1 to 10 carbon atoms, more preferably hydrogen atom or alkyl radicals having 1 to 4 carbon atoms, with the resin containing, per mole of (T) units, 0-2 mol of (Q) units, 0-2 mol of (D) units, and 0-2 mol of (M) units.

Preferred examples of silicone resins are organopolysiloxane resins which consist substantially, preferably exclusively, of T units of the formulae $PhSiO_{3/2}$, $PhSi(OR^{4'})O_{2/2}$ and $PhSi(OR^{4'})_2O_{1/2}$, T units of the formulae $MeSiO_{3/2}$, $MeSi(OR^{4'})O_{2/2}$ and $MeSi(OR^{4'})_2O_{1/2}$, and D units of the formulae $Me_2SiO_{2/2}$ and $Me_2Si(OR^{4'})O_{1/2}$, where Me is a methyl radical, Ph is a phenyl radical and $R^4$ is a hydrogen atom or optionally halogen-atom-substituted alkyl radicals having 1 to 10 carbon atoms, more preferably hydrogen atom or alkyl radicals having 1 to 4 carbon atoms, with a molar ratio of (T) to (D) units of 0.5 to 2.0.

Among these examples, particularly preferred silicone resins are those whose units of the formula (II) are formed to an extent of at least 50%, preferably at least 70%, more particularly at least 85% of T units of the formulae $PhSiO_{3/2}$, $PhSi(OR^{4'})O_{2/2}$, $PhSi(OR^{4'})_2O_{1/2}$, Me $SiO_{3/2}$, $MeSi(OR^{4'})O_{2/2}$ and $MeSi(OR^{4'})_2O_{1/2}$, with these silicone resins comprising at least 30%, preferably at least 40%, more particularly at least 50% of T units of the formulae $PhSiO_{3/2}$, $PhSi(OR^{4'})O_{2/2}$ and $PhSi(OR^{4'})_2O_{1/2}$ and at least 10%, preferably at least 15%, more particularly at least 20% of T units of $MeSiO_{3/2}$, $MeSi(OR^{4'})O_{2/2}$ and $MeSi(OR^{4'})_2O_{1/2}$.

The silicone resins preferably possess an average molar mass (number average) Mn of at least 500 g/mol and more preferably at least 600 g/mol. The average molar mass Mn is preferably at most 400 000 g/mol, more preferably at most 100 000 g/mol, more particularly at most 50 000 g/mol.

Such silicone resins at 23° C. and 1000 hPa may be either solid or liquid, with silicone resins preferably being liquid.

The silicone resins are commercially customary products (for example, Silres® IC 368 from Wacker Chemie (DE)), or they may be produced by methods common in silicon chemistry.

Additionally the reactive hotmelt adhesive composition according to the present invention may further comprise at least one tackifying polymer (tackifier). The fraction is advantageously 10 wt % to 40 wt %, based on the total weight of the composition.

Additionally the reactive hotmelt adhesive composition according to the present invention may further comprise at least one filler. Advantageously, the fraction thereof is 10 wt % to 40 wt %, based on the total weight of the composition. Illustrative fillers are calcium carbonate, as for example chalk or α-alumina, such as high-grade x-alumina. Through the use of filler it is possible to prevent or reduce the stringing when the adhesive composition is being processed.

The reactive hotmelt adhesive compositions of the invention can be used to realize high levels of filling, and this may be advantageous in a variety of applications. Examples that may be given here include applications which require high thermal conductivity or have particular requirements in relation to the fire behavior.

A further aspect of the present invention is a process for producing a reactive hotmelt adhesive composition according to the present invention, said process comprising steps a) to d).

Here in a first step (a) at least one acrylate resin-based polymer is added to at least one chemical compound which at least at 100° C. is liquid and at which at least at 150° C. the at least one acrylate resin-based polymer dissolves.

The at least one acrylic resin-based polymer may also be added to a mixture which comprises the at least one chemical compound.

The addition is made at a temperature in the range from 130° C. to 170° C., preferably in the range from 140° C. to 160° C., more particularly at 150° C.

It is additionally possible to add a tackifying polymer in step (a).

In a next step (b) the mixture is cooled to a temperature in the range from 80° C. to 120° C.

This is followed as step (c) by the addition of at least one alpha-silane-terminated organic polymer to the cooled mixture.

Lastly, in step (d), at least one oligomeric silane comprising one or more amino groups is added, to give a reactive hotmelt adhesive composition according to the present invention.

In step (c) additionally at least one filler may be added. Steps (c) and (d) preferably take place in succession such that degassing can be carried out between the steps.

The reactive hotmelt adhesive composition of the invention is roll-stable and therefore amenable to application via rolls. The reactive hotmelt adhesive composition of the invention is particularly suitable, accordingly, for a process for surface lamination in which the reactive hotmelt adhesive composition according to the present invention is applied to a substrate by means of an applicator roll.

Surprisingly it has been found that the application can be cleaned by means of a roll applicator machine even when the period of roll stability has been exceeded, i.e., when the binder on processing exhibits marked stringing which defines the applied impression.

A further subject of the present invention, accordingly, is the use of a reactive hotmelt composition of the invention for roll application.

Advantageous applications of the reactive hotmelt adhesive compositions of the invention come about as a result of their good adhesion, including initial adhesion. Even where there is no roll application, as for example in the case of use in window profile cladding, the advantageous properties set out below are apparent. Other applications are those where improved thermal conductivity can be achieved. Mention may also be made of applications associated with improved fire behavior.

Advantages apparent include, in particular, the following:

absence of isocyanate, good adhesion spectrum, particularly on metals, glass and other materials no foaming due to $CO_2$ formation.

The invention claimed is:

1. A reactive hotmelt adhesive composition comprising, based on the total weight of the composition, a)$_3$ wt % to 49 wt % of at least one alpha-silane-terminated organic polymer;

b)$_1$ wt % to less than 20 wt % of at least one acrylate resin-based polymer;

c)$_1$ wt % to 20 wt % of at least one chemical compound which is liquid at least at 100° C. and in which at least at 150° C. the at least one acrylate resin-based polymer dissolves;

d)$_{0.001}$ wt % to 5 wt % of at least one oligomeric silane comprising one or more amino groups.

2. The reactive hotmelt adhesive composition as claimed in claim 1, wherein the at least one alpha-silane-terminated organic polymer comprises a multiplicity of end groups of the formula $*\text{—X—C(=O)—N(R)—C}(R^1R^2)\text{—Si}(R^3)_a(OR^4)_{3-a}$, where X is O or N(R);

each R independently of any other is hydrogen or a hydrocarbon radical having 1 to 20 carbon atoms;

$R^1$ and $R^2$ independently of one another are hydrogen or a hydrocarbon radical having 1 to 20 carbon atoms;

$R^3$ and $R^4$ independently of one another are a hydrocarbon radical having 1 to 20 carbon atoms;

a is 1 or 2; and

"*" marks the bond for attachment to the polymer.

3. The reactive hotmelt adhesive composition as claimed in claim 1, wherein the organic polymer is a polyoxyalkylene, a hydrocarbon polymer, a polyurethane, a polyester, a polyamide, a polyacrylate, a polymethacrylate or a polycarbonate.

4. The reactive hotmelt adhesive composition as claimed in claim 1, wherein the acrylate resin-based polymer is a homoacrylate, a homomethacrylate, a copolymer of at least two different acrylates, a copolymer of at least two different methacrylates or a copolymer of at least one acrylate and at least one methacrylate.

5. The reactive hotmelt adhesive composition as claimed in claim 1, wherein the at least one chemical compound which is liquid at least at 100° C. and in which at least at 150° C. the at least one acrylate resin-based polymer dissolves, is a plasticizer.

6. The reactive hotmelt adhesive composition as claimed in claim 1, wherein the at least one chemical compound which is liquid at least at 100° C. and in which at least at 150° C. the at least one acrylate resin-based polymer dissolves is a polyalkylene glycol.

7. The reactive hotmelt adhesive composition as claimed in claim 1, wherein the at least one chemical compound which is liquid at least at 100° C. and in which at least at 150° C. the at least one acrylate resin-based polymer dissolves is an alkoxysilane.

8. The reactive hotmelt adhesive composition as claimed in claim 1, wherein the at least one oligomeric silane comprising one or more amino groups is a mixture of amino group-containing alkoxy-/hydroxy-silanes and/or silanols and condensation products and co-condensation products based thereon.

9. The reactive hotmelt adhesive composition as claimed in claim 1, wherein the composition further comprises 10 wt % to 40 wt % of at least one tackifying polymer (tackifier), based on the total weight of the composition.

10. The reactive hotmelt adhesive composition as claimed in claim 1, wherein the composition further comprises 10 wt % to 40 wt % of at least one filler, based on the total weight of the composition.

11. A process for producing a reactive hotmelt adhesive composition as claimed in claim 1, comprising the steps of (a) adding at least one acrylate resin-based polymer to at least one chemical compound which is liquid at least at 100° C. and in which at least at 150° C. the at least one acrylate resin-based polymer dissolves, or adding it to a mixture which comprises the at least one chemical compound, at a temperature in the range of 130° C. to 170° C.;

(b) cooling the mixture to a temperature in the range from 80° C. to 120° C.;

(c) adding at least one alpha-silane-terminated organic polymer to the cooled mixture;

(d) adding at least one oligomeric silane comprising one or more amino groups, to give a reactive hotmelt adhesive composition as claimed in claim 1.

12. The process as claimed in claim 11, wherein in step (a) additionally a tackifying polymer is added.

13. The process as claimed in claim 11, wherein in step (c) further at least one filler is added.

14. The process as claimed in claim 11, wherein the steps (c) and (d) take place successively and degassing is carried out between the steps.

15. A process for surface lamination, comprising the step of applying a reactive hotmelt adhesive composition as claimed in claim 1 to a substrate by means of an applicator roll.

16. The reactive hotmelt adhesive composition as claimed in claim 1, comprising, based on the total weight of the composition, 1 wt % to 10 wt % of the at least one acrylate resin-based polymer.

17. The reactive hotmelt adhesive composition as claimed in claim 1, comprising, based on the total weight of the composition, 1 wt % to 10 wt % of the at least one chemical compound which is liquid at least at 100° C. and in which at least at 150° C. the at least one acrylate resin-based polymer dissolves.

18. The reactive hotmelt adhesive composition as claimed in claim 1, comprising, based on the total weight of the composition, 0.001 wt % to 2 wt % of the at least one oligomeric silane comprising one or more amino groups.

19. The reactive hotmelt adhesive composition as claimed in claim 8, wherein the at least one oligomeric silane comprising one or more amino groups has a molecular weight of more than 500 g/mol.

* * * * *